United States Patent [19]
Johnsen

[11] 3,751,302
[45] Aug. 7, 1973

[54] GENERATING ALTERNATING AND DIRECT ELECTRIC CURRENTS BY MODIFIED FUEL CELLS

[76] Inventor: Carsten Ingeman Johnsen, 26 LeBrun Ave., Amityville, L.I., N.Y.

[22] Filed: Apr. 20, 1970

[21] Appl. No.: 30,097

[52] U.S. Cl. ............................................. 136/86 E
[51] Int. Cl. ......................................... H01m 27/00
[58] Field of Search .................... 136/3, 86; 23/204

[56] References Cited
UNITED STATES PATENTS

| | | | |
|---|---|---|---|
| 3,493,436 | 2/1970 | Johnsen | 136/86 E |
| 3,338,746 | 8/1967 | Plust et al. | 136/86 R X |
| 3,236,693 | 2/1966 | Caesar | 136/86 D |

OTHER PUBLICATIONS

Sinclair, Michael, "The Strange Case of Polywater", in Industrial Research, pp. 60–63, Sept. 1969.
Popular Science, Dec. 1969, pp. 69–71 & 185 "Water That Isn't."

*Primary Examiner*—Allen B. Curtis

[57] ABSTRACT

The activity of a fuel cell is improved by using secondary electrodes to intensify ion-transport between fuel cell electrodes and rotating of the fuel cell to produce oscillating electric pulsations.

5 Claims, 5 Drawing Figures

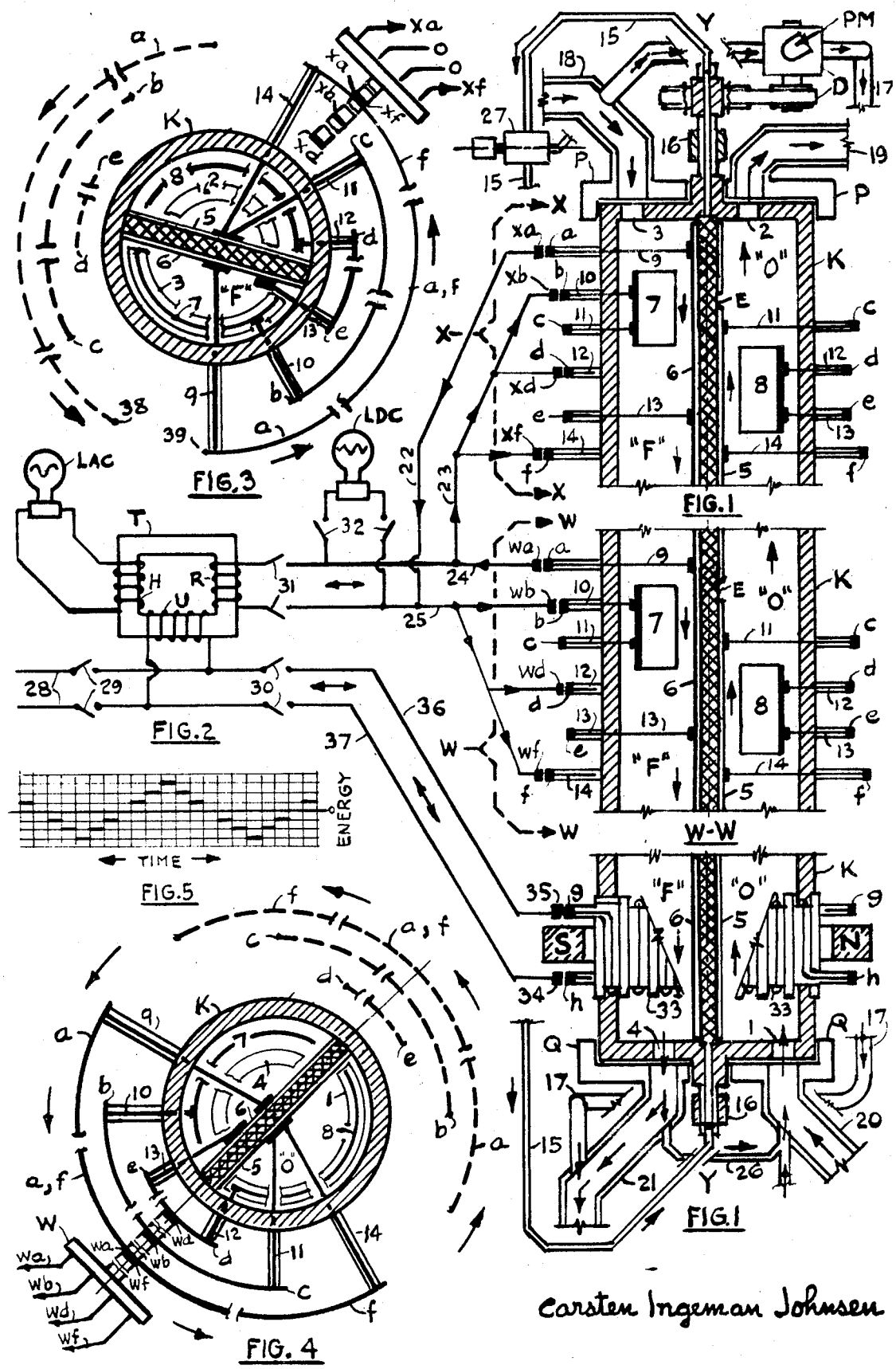

GENERATING ALTERNATING AND DIRECT ELECTRIC CURRENTS BY MODIFIED FUEL CELLS

This invention relates to improvements in the manufacture of electrical energy including Direct Electric Currents by fuel cells modified by addition of secondary electrode portions to fuel cell passages thereby intensifying ion transport between fuel cell electrodes.

An additional modification concerns the use of polymers of water, also known as polywater with useful properties for fuel cell electrolytic barriers.

Alternating electric currents may also be generated if desired by rotating a modified fuel cell continuously about a central axis, producing as a first step, oscillating electric pulsations possessing a repeated pattern having variable energy values, combined with direction reversals of the pulsation currents during each rotation cycle; and a following step, causing the pulsations to energize a multiturn coil of an electric transformer, while an appropriate alternating electric current, from an independent source possessing relevant electrical characteristics harmonizing with corresponding attributes of the said electric pulsations, energizes simultaneously a second multiturn coil of the same transformer, developing thereby mutual alternating flux in the transformer core, effecting rectification and absorption of pulsations and alternating electric currents to magnified energy combinations made available to the coupled electric load as an augmented, alternating electric current via a third coil around a leg of the core of the same transformer.

The said appropriate alternating electric current may if desired be generated by equipping rotated fuel cell appurtenances with a competant coil armature recovering electrical energy as hereinafter outlined.

Failure of conventional fuel cells to effect generation of electrical energy at the high thermal and economic efficiency levels they are theoretically capable, is due to several causes, one being sluggishness of electromotive forces transporting ions from one passage to the other. Insufficient electrode areas limit ionic transport. The fact that conventional fuel cells are incapable of generating alternating electric currents is an additional matter with which my present invention is concerned.

By the use of my invention in its entirety or using one or more of its novel features hereinafter described, illustrated and claimed, substantial economies in the expenditure of materials and energy will result, new high thermal and economic efficiencies will be reached, changing a hoped for distant possibility to an immanent probability apparent to those familiar with pertinent arts.

My invention is illustrated in broad outlines by the accompanying drawing. In the said drawing:

FIG. 1 illustrates a crossection of a modified fuel cell capable of generating unidirectional electric current made available to the coupled load "LDC" via leads 24 and 25, the fuel cell being stationary.

When the fuel cell enclosure K is continuously rotated by drive D, oscillating electric pulsations may be generated as described hereinafter and converted to an alternating electric current in electric transformer T.

View W—W inserted between upper and lower portions of FIG. 1, serves to understand how periodic reversals of recovered direct current directions may be effected by connecting leads 22 and 23 from brush set X—X and leads 24 and 25 from brush set W—W, to opposite poles of coil R.

The lower portion of FIG. 1 illustrates a means for generating alternating electric current utilized to energize, if desired, multiturn coil U of transformer T via leads 36 and 37.

Item 27 and pipes 15 concern circulation of fuel cell electrolytes when liquids are used for barrier material E.

FIG. 2 illustrates diagrammatically transformer T with multiturn coils H, R and U; coil R energized by recovered oscillating electric pulsations, while coil U is energized via leads 28 by an alternating electric current from an independent source or via leads 36 and 37 from coil armature 33. The augmented alternating electric current is made available to coupled load LAC via coil H.

FIG. 3 is a diagrammatic illustration of one of the successive positions of the enclosure when rotated; specifically the one, shown in solid lines, when a typical intermediate energy value is being recovered. The dotted lines indicate a position of the enclosure when no contact is established between the brush set X—X and any of the arc segments. This is therefore called a zero value hereinafter.

FIG. 4 illustrates another position of the rotated enclosure, including the one shown by solid lines when a maximum energy value is being recovered from the electrodes of the rotated producing fuel cell via brush set W—W. The dotted lines indicate as in FIG. 3 recovery of a zero value, there being no contact between W—W and segments.

FIG. 5 is a graph plotted between Time and Energy values recovered during several rotation cycles, energy values recovered via brush set X—X being plotted above the assumed datum line while energy values recovered via W—W are plotted below the same datum line.

Embodiments of the processes herein described, illustrated and claimed includes FIG. 1 with enclosure K, a cylindrical shaped vessel with closed ends having entry and exit openings. The enclosure is divided into two separate passages, passage O for an ionized oxidant and the other passage F for, by way of example, an oxidizable carbonaceous fuel, the two passages being separated by an electrolytic barrier installed between a primary electrode 5 on its oxidant passage side and a primary electrode 6 on its fuel passage side.

Fuel and oxidants are injected into respective passages via ports 3 and 1 from matching supply pipes 18 and 20 while discharges are ejected via ports 2 and 4 to matching pipes 19 and 21 in items P and Q for disposal.

It will be noted in FIG. 1, FIG. 3 and FIG. 4 that entry and exit ports are shaped and located relatively to matching entry and exit pipes such that, whether the said enclosure is stationary or rotated, fuel supplies will be denied entry into oxidant passage and vice versa; nor will discharges from passages be permitted to enter any but the proper exit pipes.

A secondary electrode portion 7 is shown installed in fuel passage F and connected electrically to primary electrode 5 on the oxidant passage side of the barrier; while secondary electrode portion 8 is installed in oxidant passage O and is connected to primary electrode 6; items 7 and 8 connected separately to exterior circuit, coil R or load LDC, as desired.

When providing oscillating electric pulsations having the required appropriate attributes for rectification and absorption to augmented alternating electric currents, enclosure K together with mounted attachments are caused to be rotated continuously about axis Y—Y, rotation effected by an electric motor, or by a prime mover PM, via drive D and the shaft, integral with enclosure K, turning in bearings 16. The prime mover may operate on fuel equal to fuel cell fuel, discharging via 17 into pipe 21 from passage F for joint treatment or disposal.

Mounted on the exterior periphery of the enclosure are a plurality of spaced, electricity conducting, circular shaped arc segments, $a$, $b$, $c$, $d$, $e$ and $f$, centered about axis Y—Y, the said segments having a variety of arc lengths adapted to the end in view hereinafter described and illustrated in FIG. 1, FIG. 3 and FIG. 4, each segment connected separately to respective electrodes 5, 6, 7 and 8 via conductors 9, 10, 11, 12, 13 and 14.

The accompanying drawing illustrates two independent sets of stationary energy collecting brushes with prefixes X and W installed 180° apart and connected by separate pairs of leads illustrated, to coil R of transformer T. The two brush sets make separate, periodically repeated contacts with corresponding rotated arc segments, recovering successively by each set separately, a series of surges of unidirectional electric currents possessing variance with respect to energy values. Reversals of directions of the recovered electric current surges as supplied to coil R during each rotation cycle, are effected by connecting leads from the two independent brush sets to opposite poles of the multiturn coil R, reversing current directions.

Simultaneously with said recurring current direction reversals, the oscillating electric pulsations may be caused to possess a periodically repeated pattern of variable energy values which may, for descriptive purposes only, be visualized as vibrating above and below an assumed datum line, the said variance with respect to energy values being produced in the following manner:

During a typical revolution cycle the following is caused to occur, beginning for example, as shown in FIG. 3 when point 39 of arc segments $a$ and $f$ has advanced from point 38. During that time interval, no contact is established between a collecting brush and an arc segment, thus no energy recovery is effected, called herein a zero value.

Fuel and oxidant being continuously supplied to fuel cell as outlined hereinbefore while enclosure and attachments continue their rotation in the direction indicated, the said zero value is followed by a step comprising the recovery of a minimum energy value, a typical example occurring as illustrated by the solid lines of FIG. 3 when collecting brush $Xa$ contacts all or a portion of arc segment $a$ and thus all or a portion of electrode 6 via conductor 9, while collecting brush $Xf$ simultaneously contacts all or a portion of arc segment $f$ and thus all or a portion of electrode 5 via conductor 14; the recovered energy value energizing multiturn coil R via lead 22, connected to lead 25, while lead 23 is connected to lead 24, switches 31 being closed and switches 32 being disconnected.

The enclosure and attachments continuing their rotary movement the minimum energy value will be followed by recovery of a series of intermediate values increasing progressively by equal increments to and including a maximum energy value; the number of said series of separate values being a function of the number of separate electrode portions provided for in the fuel cell passages, each connected to corresponding arc segments contacting periodically collecting brushes recovering said energy values to coil R.

A typical energy value of any and all of the said series of intermediate values is recovered to coil R when collecting brushes contact one or more arc segments each connected to an electrode portion via a conductor the value of the said recovered energy value being a function of and determined, as well as guantitatively measurable, by the product of the sum of the arc lengths of the said arc segments contacted and the total surface areas of the electrode portions to which the said arc segments are electrically connected.

A maximum energy value is recovered as illustrated by the solid lines of FIG. 4 where collecting brushes $wa$, $wb$, $wd$ and $wf$ make simultaneous electrical contacts with corresponding arc segments $a$, $b$, $d$ and $f$ recovering energy originating in primary electrodes 5 and 6 as well as in secondary electrode portions 7 and 8, an equivalent energy value being recovered in a similar manner via collecting brush set X—X when, as and if arc segments $a$, $b$, $d$ and $f$ in FIG. 3 rotate to contact collecting brushes $Xa$, $Xb$, $Xd$ and $Xf$ thereby energizing coil R with said recovered maximum energy value.

The enclosure continuing its rotation a new series of thereupon decreasing energy values are recovered by brushes of collecting brush set X—X when contacting corresponding arc segments, said decreasing values being quantitatively equal to similarly placed values in the said series of increasing intermediate values but in a reverse order of value variance, each decreasing energy value decreasing degressively by equal decrements equal quantitatively to said increments, finally arriving at a zero value.

The said rotated plurality of arc segments having completed the said series of energy recovery contacts with brush set X—X and rotation continuing, the same arc segments will thereupon contact brushes of brush set W—W recovering first a series of increasing values from a minimum through intermediate values to a maximum followed by a series of decreasing values through intermediate values to a new zero values, said increasing and decreasing energy values recovered in a similar manner described hereinbefore for activities when arc segments contact brush set X—X with the exception that direction of recovered current delivered to coil R via brushes of brush set W—W, will be reversed as illustrated.

The above described successive energy recovery contacts of brush sets X—X and W—W with corresponding arc segments connected to electrode portions will continue indefinitely, the enclosure and mounted arc segments being continuously rotated, fuel and oxidant adequately supplied and energy conserved; generating oscillating electric pulsations possessing a repeated pattern having variable energy values combined with direction reversals of the pulsation electric current during each rotation cycle of the rotated enclosure.

Those familiar with the pertinent arts will have no difficulty in effecting recovery of additional intermediate energy values, in numbers over and above those described and illustrated in FIG. 1, FIG. 3 and FIG. 4; by way of example, dividing primary electrodes 5 and 6 into portions, each being connected to separate arc segments periodically contacting their individual brushes.

Equivalent oscillating electric pulsations possessing the same periodically repeated variance pattern with respect to energy and current direction described hereinbefore may be produced using the equipment illustrated by causing enclosure K and attachments to remain in a stationary position while the brush sets X—X and W—W are rotated continuously about axis Y—Y. Generated unidirectional electric surges originating in producing fuel cell electrodes are recovered by the rotated collecting brush sets from corresponding stationary arc segments in substantially the same manner outlined hereinbefore for stationary brush sets and rotated arc segments, energizing coil R of transformer T via secondary stationary collecting brush sets which are caused to contact the corresponding rotated brush sets separately on the one hand and connected to the external circuit on the other hand.

The said oscillating electric pulsations produced as described above while energizing coil R of transformer T, may be rectified to standard alternating electric current by simultaneously energizing the multiturn coil U of the same transformer by an added alternating electric current from an independent energy source, the said added current possessing relevant electrical characteristics harmonizing substantially with corresponding attributes of the said oscillating electric pulsations, developing thereby a mutually produced alternating flux in the transformer core, accomplishing rectifcation and absorption of the pulsations by the added current, to magnified energy combinations, made available as an augmented alternating electric current to the coupled electric load LAC via the third multiturn coil H of the same electric transformer T.

The said appropriate added alternating electric current for above outlined rectification and absorption purposes, may if desired be generated by equipping the lower portion of FIG. 1 with armature coil 33 on its exterior periphery illustrated, continuous rotation about the central axis Y—Y in a magnetic field produced by an activated electromagnet having poles N and S, said armature coil connected to continuously rotated electrical conductors g and h mounted on the enclosure exterior periphery as illustrated, stationary collecting brushes 34 and 35 recovering alternating electric current to multiturn coil U via leads 36 and 37.

Direct electric current may be generated to advantage when the above described fuel cell enclosure including all attachments is in a stationary position, in substantially the same manner effected in conventional fuel cells, improved by installation of secondary electrode portions in fuel cell passages as illustrated in FIG. 1, thereby enhancing ion transport between electrodes as well as augmenting absorption of ion-liberated electrical charges. When utilizing the fuel cell illustrated for generating direct current, the brush set utilized will be one where all brushes are in electrical contact with their corresponding arc segments, illustrated, by way of example, by collecting brushes of brush set W—W, when in contact with arc segments illustrated by solid lines of FIG. 4, delivering direct electric current via leads 24 and 25 to coupled load LAC.

It is not the intention to limit the present invention to the use of any specific combination of electrochemically reactive substances in producing fuel cells herein considered, mention of an oxidant for one passage and an oxidizable carbonaceous fuel for the other passage is for illustration only.

To overcome fuel cell reaction deficiencies from concentration polarization, a compensating chemical substance is supplied to passage O via 26.

Durability as well as uninterupted production by fuel cells are beneficial results from use of the new substance polymerized water, also called polywater, for fuel cell electrolytic barriers having appropriate properties for said purposes including continuing liquidity and stability of state at elevated temperatures of the order of 500 ° C, circulation for rectification purposes being effected as illustrated via pipe 15 and item 27 if necessary or desired. It may be manufactured by polymerization of normal water with the aid of catlysts, or by condensation of water vapor in fuzed quarts capillaries in a sealed system, or by other methods being developed but not a part of my present invention.

Having described my invention relating to methods and means for the generation of direct as well as alternating electric currents using modified fuel cells operated as outlined hereinbefore, I claim:

1. In the process for generating electricity which comprises passing an ionized oxidant through the first passage of the enclosure of a producing fuel cell while a fuel is passed through its second passage separated from the first passage by an electrolytic barrier installed between primary electrode portions connected to a coupled electric load via an external circuit; the method for producing periodically repeated direction reversals of fuel cell generated electric currents which includes a first step, modifying the energy exchange system of the fuel cell by mounting a group of spaced, electricity conducting, arc segments having a variety of arc lengths, on the exterior periphery of the cylindrical shaped fuel cell enclosure, each arc segment connected separately to a corresponding electrode portion; and a second step, effecting the continuous rotation of the enclosure and its mounted arc segments around a central axis; followed by a third step, placing a duality of stationary, electricity collecting brush sets in contact positions with said rotated arc segments, the duality of brush sets being independent of each other by installation a half revolution of the rotated arc segments apart, making available a duality of separate successive series of variable energy values recovered from the said electrode portions via the single group of rotated arc segments; and a fourth step connecting the collective leads from each of the said duality of independent brush sets to opposite poles of the external circuit, effecting periodically repeated direction reversals of the electric currents generated by said producing fuel cell.

2. The method as claimed in claim 1 having in addition an alternate to the second step of said claim 1, which comprises effecting the continuous rotation of the said duality of independent electricity collecting brush sets, in unison, around the same central axis, while the fuel cell enclosure and mounted arc segments remain in a stationary position; the individual brushes of the now rotating duality of brush sets making periodically repeated electrical contacts with corresponding arc segments, recovering recurring series of variable energy values in a manner equivalent to procedure, having the same object, outlined in the third step of claim 1; the recovered energy values being transferred to the fuel cell external circuit via an added duality of stationary brush sets placed in contact positions with the corresponding rotated duality of brush sets, while in addition, connected separately to the opposite poles of the external circuit, effecting periodically repeated direction reversals of electric currents generated by the said producing fuel cells.

3. The method claimed in claim 1, providing in addition for the production of oscillating electric pulsations possessing a periodically repeated pattern of variable energy values which includes a first step additionally modifying the fuel cell energy exchange system effected by adding secondary electrode portions to fuel cell fuel passage connected electrically to primary electrode portions located on the oxidant passage side of the electrolytic barrier, while also adding secondary electrode portions to fuel cell oxidant passage connected electrically to primary electrode portions located on the fuel passage side of the same barrier, each of the said primary and secondary electrode portions being connected to a corresponding arc segment of the mounted group of arc segments having a variety of arc lengths; and a second step, recovering a series of variable energy values by the first of the said duality of electricity collecting brush sets, from a variety of possible combinations, of on the one hand, electrode portions having differing areas and thus a variety of electron absorbing and yielding capabilities, and on the other hand, arc segments having various arc lengths; the said combinations thereby possessing adequate competance for the recovery of recurring series of energy values which vibrate continuously above and below an assumed datum line; beginning, by way of example, from a zero value increasing progressively through a succession of intermediate energy values, each increasing by equal increments to a maximum value; thereupon decreasing degressively through a succession of decreasing intermediate values, each decreasing by equal decrements, which are equal to said increments, arriving at a zero value; followed by a third step recovering a plurality of variable energy values by the second of said duality of brush sets, in numbers and individual values equal to above outlined succession of increasing and decreasing energy values, being recovered in a manner similar to procedure described for the first of the duality of brush sets; increasing progressively from said zero value through a succession of intermediate energy values, each increasing in value by equal increments to a maximum value; thereupon decreasing degressively through a succession of decreasing intermediate values, each decreasing by equal decrements which are equal to said increments, arriving at a zero value; the above outlined series of increasing and decreasing energy values recovered by the duality of brush sets in succession, are repeated indefinitely, generating oscillating electric pulsations possessing a periodically repeated pattern of variable energy values made available to the coupled electric load.

4. The method claimed in claim 1 providing in addition for rectification of periodically recurring unidirectional electric current pulsations having competent characteristics, to true alternating electric current, which includes a first step energizing a multiturn coil around a portion of the core of an electric transformer utilizing said pulsations possessing qualities including a periodically repeated pattern of current direction reversals in combination with correspondingly repeated energy value variance, vibrating from a minimum value through a series of increasing intermediate values to a maximum energy value with respect to a datum; thereupon decreasing through a comparable series of intermediate values to a new and equal minimum energy value; the said energy variance series repeated indefinitely; followed by a second step simultaneously energizing a second multiturn coil around a second portion of the core of the same electric transformer, utilizing an appropriate alternating electric current supplied from an available energy source, possessing attributes which are harmonious and combinable with relevant qualities of the said unidirectional pulsations; the energizing of the said duality of multiturn coils developing jointly, a shared pulsating and alternating flux in the transformer core effecting mutual absorption, digestion and rectification of the heretofore separate pulsations and alternations, resulting in an alternating electric current with augmented energy values, made available in a third step to a coupled electric load when connected to a third multiturn coil around a third portion of the core of the same electric transformer.

5. The method claimed in claim 1, providing, in addition, for intensification of ionic transport between electrodes which includes adding secondary electrode portions to the fuel cell fuel passage connected electrically to the primary electrode located on the oxidant passage side of the fuel cell electrolyte; and adding secondary electrode portions to the fuel cell oxidant passage connected electrically to the primary electrode located on the fuel passage side of the fuel cell electrolyte; the said electrode portions enhancing ionic transport between primary and secondary electrode portions, augmenting electrical energy output of producing fuel cells.

* * * * *